United States Patent [19]
Elkins

[11] Patent Number: 5,937,567
[45] Date of Patent: Aug. 17, 1999

[54] FISHING ROD HOLDER

[75] Inventor: John W. Elkins, East Prairie, Mo.

[73] Assignees: Ellis Wayne Elkins, Dawson Springs, Ky.; Nancy L. Elkins, Dawson Springs, Ky.

[21] Appl. No.: 08/898,624

[22] Filed: Jul. 21, 1997

[51] Int. Cl.⁶ .................................................. A01K 97/10
[52] U.S. Cl. ........................... 43/21.2; 248/520; 248/538
[58] Field of Search ............................. 43/21.2; 248/514, 248/517, 520, 538

[56] References Cited

U.S. PATENT DOCUMENTS

| | | | |
|---|---|---|---|
| 2,964,868 | 12/1960 | Bennett ........................................ | 43/15 |
| 3,293,789 | 12/1966 | Pack ............................................. | 43/15 |
| 3,708,141 | 1/1973 | Friedgen et al. ........................... | 248/42 |
| 3,851,916 | 12/1974 | Quartullo ................................. | 297/188 |
| 3,862,508 | 1/1975 | Morgan . | |
| 3,945,143 | 3/1976 | Schmitt, Sr. ................................ | 43/17 |
| 4,097,017 | 6/1978 | Hazlitt ..................................... | 248/515 |
| 4,245,419 | 1/1981 | McManus ................................. | 43/21.2 |
| 4,486,968 | 12/1984 | Gould ......................................... | 43/15 |
| 4,637,156 | 1/1987 | Simmons ................................. | 43/21.2 |
| 4,645,167 | 2/1987 | Hardwick ................................. | 248/520 |
| 4,722,567 | 2/1988 | Hashihara ................................. | 297/217 |
| 4,730,408 | 3/1988 | Miller ......................................... | 43/15 |
| 4,739,575 | 4/1988 | Behrle ....................................... | 43/21.2 |
| 4,823,723 | 4/1989 | Brooks ..................................... | 114/343 |
| 4,879,963 | 11/1989 | Dionne ..................................... | 114/363 |
| 5,245,778 | 9/1993 | Gallegos et al. ........................... | 43/15 |
| 5,247,759 | 9/1993 | Noriega ..................................... | 43/21.2 |
| 5,295,321 | 3/1994 | Matura ....................................... | 43/21.2 |
| 5,435,093 | 7/1995 | Minorics et al. ......................... | 43/19.2 |
| 5,501,028 | 3/1996 | Hull et al. ................................. | 43/17 |

FOREIGN PATENT DOCUMENTS

| | | |
|---|---|---|
| 2590962 | 6/1987 | France . |
| 406030683 | 2/1994 | Japan ............................ A01K 97/10 |
| 2 275 857 | 9/1994 | United Kingdom . |

*Primary Examiner*—Jack W. Lavinder
*Attorney, Agent, or Firm*—Grace J. Fishel

[57] ABSTRACT

A fishing rod holder with an open frame and front and rear cradles pivoted with a lever about a mounting member upon which it is mounted. The frame is resiliently biased against a stop to prevent over-rotating and the frame is preferably offset for use with a fishing rod having an offset or decurved handle.

7 Claims, 3 Drawing Sheets

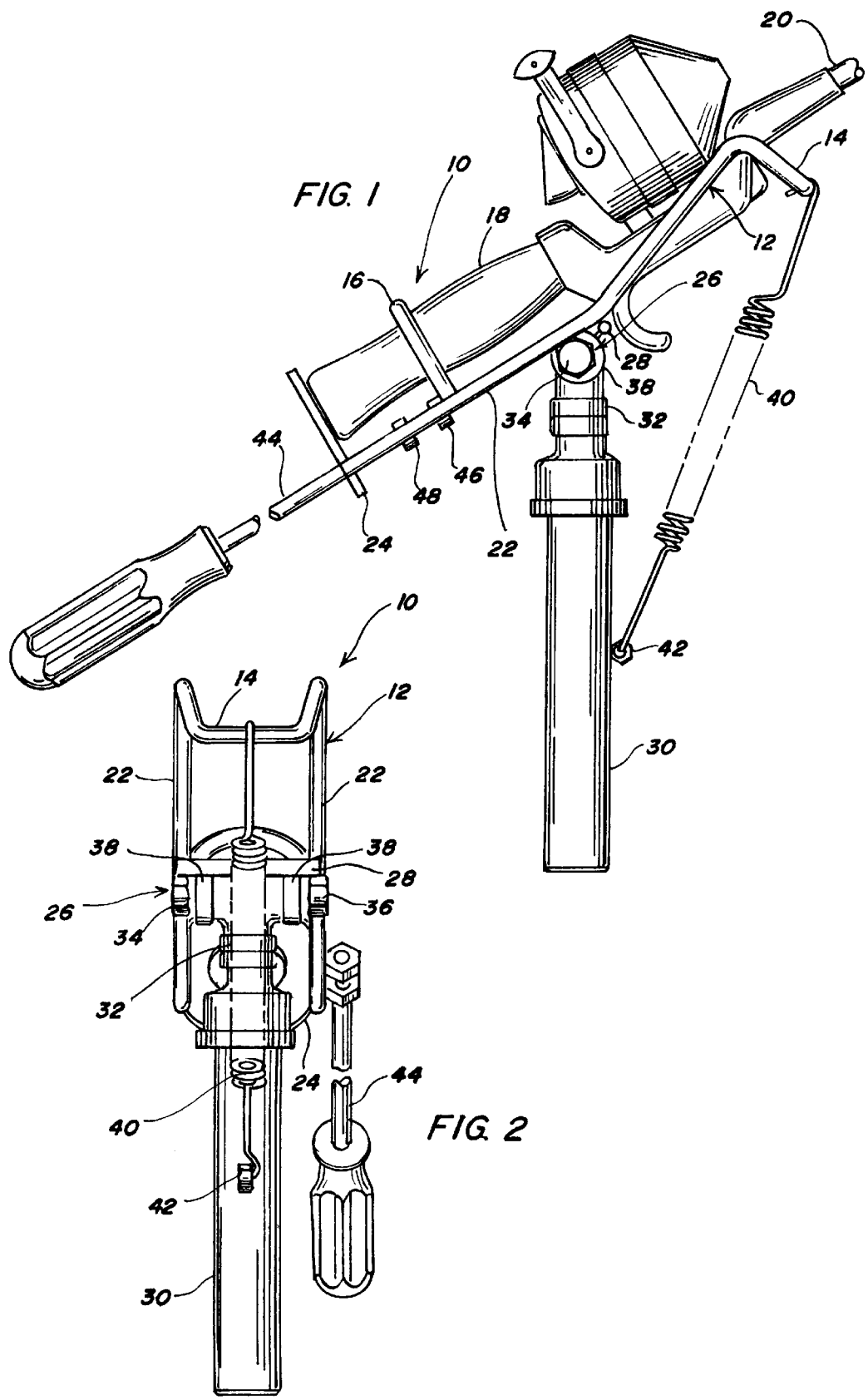

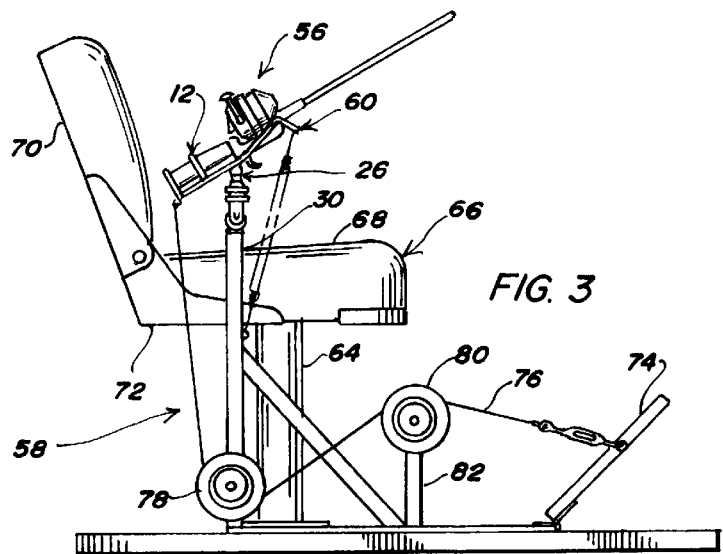
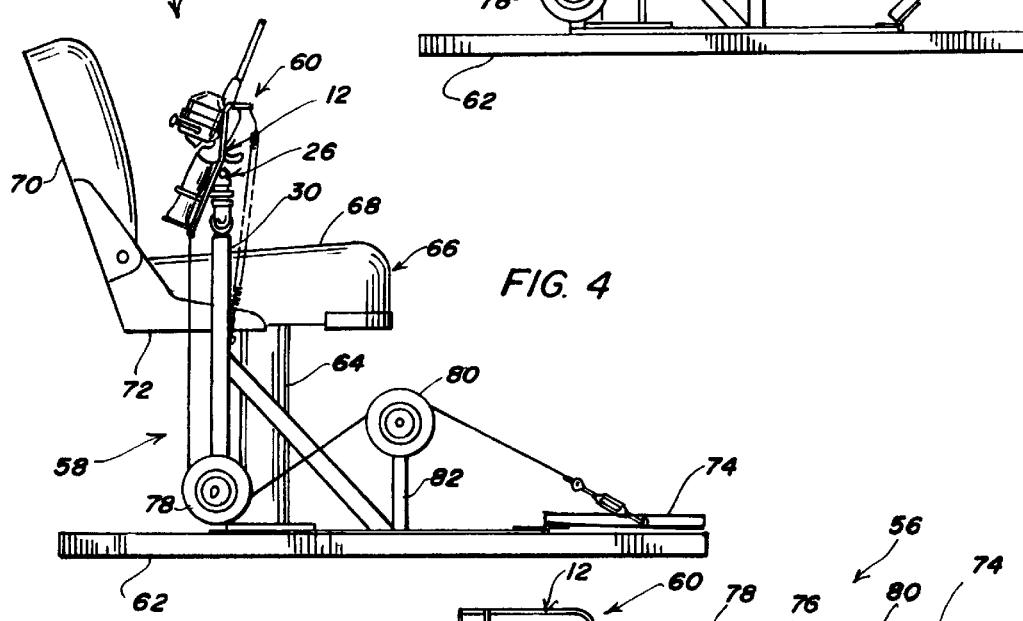
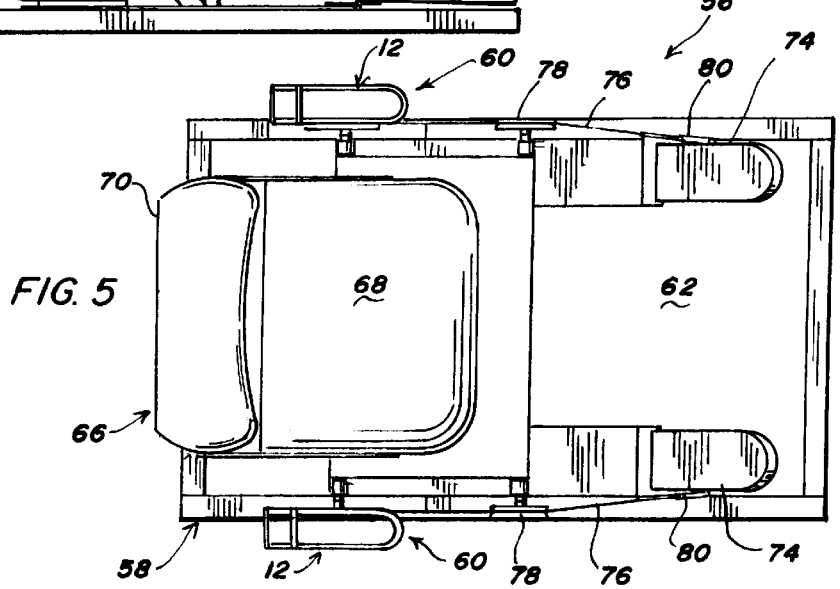

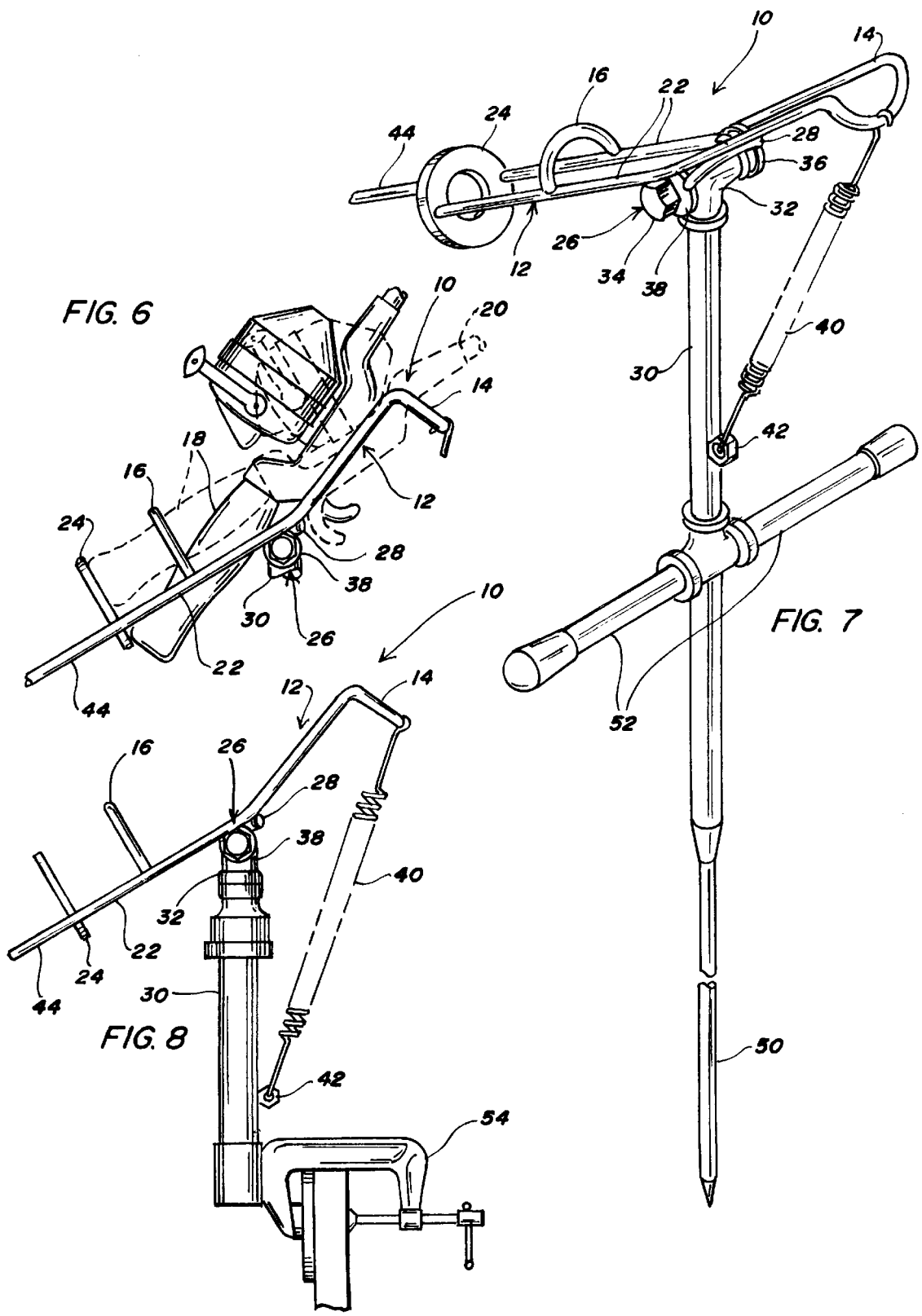

FISHING ROD HOLDER

BACKGROUND OF THE INVENTION

1. Field of the Invention

The present invention relates to a holder for holding a fishing rod under the observation of a fisherman who, at the critical moment, must take charge of the rod and implant the hook in the mouth of a fish. The fishing rod holder increases the ease but not necessarily the productivity of fishing, as that still depends upon the skill of the fisherman.

2. Brief Description of the Prior Art

It is common practice for a fisherman to put his fishing rod into a holder while he is waiting for a fish to strike as holding the pole over long periods of inactivity can be tiring. Some of the prior art fishing rod holders are spring-biased under control of a latch that is triggered when a fish bites, automatically jerking the fishing line and setting the hook. These devices take some of the sport out of fishing. Other of the prior art holders require that the fisherman maintain the rod under observation, so that, when a fish bites, he takes the rod out of the holder and into his hands, trying to land the fish in the usual way. Some of these latter devices are of the clamp type and all of them, insofar as known, are either cumbersome or difficult to use, failing in particular to give the fisherman quick access to his fishing rod.

While trolling, another problem with the prior art fishing rod holders is that the rod tends to bounce when the fishing tackle hits a temporary snag on the bottom. With spring-biased holders, a snag may apply sufficient force to trigger the latch, jerking the fishing line, frequently making the snag even worse or breaking the line. With clamp type rod holders, on the other hand, the force may cause the rod to open the clamp and bounce out of the holder, possibly falling into the water and being lost.

The period just as the fish starts to take the bait is critical and many fish have been lost because the fisherman was not quick enough to get his hands on the rod and jerk it in the necessary arc. None of the prior art fishing pole holders, insofar as known, provide a lever to assist the fisherman in the initial jerk and then free the rod so that the fisherman can land the fish in the normal manner.

Fishing is a sport that can be pursued throughout one's lifetime, however, sometimes it is difficult for a person who is physically challenged to jerk the pole with his hands as required to initially set the hook. None of the prior art devices address this need, either, with a holder that still requires the fisherman to act at the critical moment, setting the pole in motion with a lever which can be operated with a foot or the like.

In view of the above, there is a continuing need for a fishing rod holder for holding a rod while a fisherman is waiting for a strike, which holder is resistant to snags and allows for exceptionally quick release of the rod after setting the hook with a lever. There is also a need for a fishing rod holder with the above-mentioned attributes that can be rigged so that it is operable other than by hand.

SUMMARY OF THE INVENTION

In view of the above, it is an object of the present invention to provide a fishing rod holder that satisfies the above-mentioned needs. Other objects and features of the invention will be in part apparent and in part pointed out hereinafter.

In accordance with the invention, a fishing rod holder has an elongated open frame with a front cradle member and a rear cradle member. Front cradle member is generally U-shaped facing upwardly and rear cradle member is generally U-shaped facing downwardly. The frame has a transverse pivot between the front and rear cradle members with a stop between the pivot and the frame to prevent the frame from over-rotating and spilling a fishing rod that is seated in said front and rear cradle members. A resilient biasing member is provided for biasing the frame against the stop and a lever is attached to the rear cradle for rocking the frame about the pivot for use in setting a hook in the mouth of a fish. After the fish is hooked, the fishing rod is quickly released as it is picked up by the fisherman.

In one embodiment, the fishing rod holder is mounted on a spike and in another, it is mounted on a C-clamp. Other possible embodiments are illustrated, including one wherein the fishing rod holder is mounted on a base upon which is also mounted a fishing seat. In this embodiment, the frame is rocked with a foot operated treadle.

The invention summarized above comprises the constructions hereinafter described, the scope of the invention being indicated by the subjoined claims.

BRIEF DESCRIPTION OF THE DRAWINGS

In the accompanying drawings, in which several of various possible embodiments of the invention are illustrated, corresponding reference characters refer to corresponding parts throughout the several views of the drawings in which:

FIG. 1. is a side elevational view of a fishing rod holder in accordance with the present invention shown attached to a rod mounting member;

FIG. 2 is a front elevational view of the fishing rod holder;

FIG. 3 is a side elevational view of a fishing apparatus in accordance with the present invention in at-rest position;

FIG. 4 is a side elevation view of the fishing apparatus shown in FIG. 3 in in-us position;

FIG. 5 is a top view of the fishing apparatus;

FIG. 6 is a partial side elevational view of the fishing rod holder showing a fishing rod handle being inserted into the holder in full lines and in at-rest position in broken lines;

FIG. 7 is a perspective view of the fishing rod holder shown mounted on a spike; and, FIG. 8 is a side elevational view of the fishing rod holder shown mounted on a C-clamp.

DETAILED DESCRIPTION OF THE INVENTION

Referring to the drawings more particularly by reference character, reference numeral 10 refers to a fishing rod holder in accordance with the present invention. As seen in FIGS. 1–2 and 6–8, rod holder 10 is an elongated open frame 12 with a front cradle member 14 being generally U-shaped facing upwardly and rear cradle member 16 being generally U-shaped facing downwardly. Front and rear cradle members 14, 16 are axial aligned so that the forward end of a rod handle 18 and the weight of the rod is supported on front cradle member 14 while the rearward end of the handle is received in rear cradle member 16. Front and rear cradle members 14, 16 can take a variety of forms providing they have dimensions and are spaced apart adequately to receive and support a fishing rod 20. More particularly, front and rear cradle members 14, 16 have a diameter wide enough to receive rod handle 18 and are spaced apart a distance sufficient to support the handle. For use with a fishing rod wherein handle 18 is offset (as shown in the drawings), frame 12 is preferable offset also so that front cradle member 14 is elevated above rear cradle member 16 and the offset of handle 18 abuts the bight of front cradle member 14, blocking the fishing rod in rod holder 10 so that it cannot be easily pulled from the holder by the surge of a hooked fish or by a temporary snag.

In the form illustrated in the drawings, sides 22 and front cradle member 14 of frame 12 are made of a continuous piece of steel wire or round steel bar stock, although frame 12 may be formed of a variety of materials such as plastic or aluminum. Opposite front cradle member 14, sides 22 are joined with a plate 24, illustrated as a washer, against which the butt of handle 18 rests, preventing the fishing rod from sliding through the rod holder. Rear cradle member 16 is formed from a separate piece of wire that is joined, as by welding, to sides 22.

Open frame 12 has a transverse pivot 26 between front and rear cradle members 14, 16 with a stop 28 between the pivot and the frame to prevent the frame from over-rotating and spilling a fishing rod that is seated in the front and rear cradle members. Pivot 26 is attached to a mounting member 30, shown as a rod, to which the stem of a pipe tee 32 is threaded. A bolt 34 passes through the arms of the pipe tee 32 and a nut 36 is threaded on the bolt. The head of bolt 34 and nut 36, backed by washers 38, are attached to sides 22 and serve as an axle about which frame 12 pivots in pipe tee 32. Stop 28 is illustrated as a short length of curved rod attached to pipe tee 32. It will be appreciated that pivot 26 may be attached to mounting member 30 in a variety of ways. For example, in a more permanent assembly, rod holders are welded or glued to mounting member 30. Alternatively, if a modular fishing jig is desired as shown in the drawings, rod holders can be screwed onto mounting member as seen in FIGS. 1–2, 3–4 and 7–8.

A resilient biasing member 40 for biasing frame 12 against stop 28 is provided. As shown in the drawings, biasing member 40 is a coil spring, although an elastic cord (e.g., a bungee cord), air cylinder or the like, could also be used, as will occur to those skilled in the art. Resilient biasing member 40 interconnects front cradle member 14 with rod mounting member 30 below pivot 26. Opposite ends of resilient biasing member 40 may be provided with hooks, one of which is hooked to front cradle member 14 and the other of which is hooked in a eye 42 provided on rod mounting member 30.

A lever 44 is attached to open frame 12 at rear cradle member 16 for rocking the frame about pivot 26. Lever 44 may be an extension of one of sides 22 or may be detachable from frame 12 or even remote as shown in FIGS. 3–5. When detachable, a nut 46 and a guide eye 48 may be attached to one of sides 22 and lever 44 may be threaded. In assembly, the threaded end of lever 44 is passed through guide eye 48 and threaded into nut 46.

As shown in FIG. 7, mounting member 30 may be attached to a spike 50 to be driven into the earth along a river bank or on shore by pressing or stepping on arms 52. Mounting member 30 may also be attached to a C-clamp 54 as shown in FIG. 8 for mounting on a gunwale of a boat or to a stationary object such as a bench or a plank. Other possible attaching means include pegs for insertion into pre-existing holders (e.g., oarlocks) on a boat or the like.

In use, rod holder 10 is anchored in place at the water's edge, as previously stated on a spike, C-clamp or the like. Rod holder 10 can be used with fishing rods with a straight handle such as are used in spinning or spin casting or with fishing rods with an offset or decurved handle as are used in bait casting and some forms of spin casting. When frame 12 is offset, rod holder 10 is especially useful with fishing rods having an offset or decurved handle as the offsets notch together to block the rod handle in the rod holder. After the fisherman has cast his fishing line with the attached tackle, he inserts rod handle 18 through open frame 12. When he lays the rod handle down in rod holder 10, it naturally seats itself in front and rear cradle members 14, 16 with the butt of the handle pressed against plate 24.

If the fisherman is trolling and the fishing tackle hits a temporary snag, jerking the line, part of the energy of the snag is absorbed by resilient biasing member 40, which dampers the vibrations, so that there is little tendency for fishing rod 20 to bounce out of rod holder 10. When a fish starts to take the bait, the fisherman can act quickly, using lever 44 to rotate fishing rod 20 in an upward arc, setting the hook before the fish is lost. As the fishing rod rotates, the forward end of the handle is pressed down in the front cradle member 14 and the rearward end of the handle is pressed up into the rear cradle member 16. The fisherman can then pick up the fishing rod, which in the natural motion thereof is released from rod holder 10, and proceed to land the fish in the usual way. The lever assist does not detract from the sport of fishing, as it is still necessary for the fisherman to act at the critical moment.

In the embodiment of the invention shown in FIGS. 3–5, a fishing apparatus 56 comprises a fishing seat 58 and a fishing rod holder 60. Referring now to the drawings in more detail, fishing seat 58 includes a base 62 upon which is attached a pedestal 64 with a chair 66 mounted on the pedestal. The chair includes a seat 68 and a back rest 70 which are connected by a pair of folding brackets 72. Back rest 70 is normally in the vertical position shown in the drawings, but brackets 72 allow it to be folded down on top of seat 68 when not in use. A foot operated treadle 74 is attached to base 62 in front of chair 66.

Fishing rod holder 60 is substantially identical to fishing rod holder 10 described above except that treadle 74 serves the function of lever 44 and rod mounting member 30 is mounted on said base adjacent chair 66 where it is conveniently accessible to the occupant of the chair. As shown in the drawings, a line 76 is attached to treadle 74 and to the rear of frame 12, passing under a first fixed pulley 78 attached to base 62 adjacent mounting rod 30 and over a second fixed pulley 80 mounted on a support 82 attached to base 62 intermediate the first pulley and the treadle. Second fixed pulley 80 is elevated above the point of attachment of line 76 to treadle 74. When treadle 74 is rocked, line 76 causes frame 12 to rotate on pivot 26, in the same manner as lever 44 operates the embodiment shown in FIGS. 1–2 and 6–8. Two rod holders 60, as shown in FIGS. 3–5 may be provided, one mounted on each side of chair 66 so that the fisherman may simultaneously fish with several rods. A fisherman with a physical disability which makes it difficult for him to jerk a fishing pole in an arc will find fishing apparatus 56 particularly useful.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A fishing rod holder comprising an elongated open frame with a front cradle member being generally U-shaped facing upwardly and a rear cradle member being generally U-shaped facing downwardly, said frame having a transverse pivot between said front and rear cradle members with a stop between the pivot and the frame to prevent the frame from over-rotating and spilling a fishing rod that is seated in said front and rear cradle members, a resilient biasing member for biasing the frame against said stop, and a lever attached to the rear of the elongated open frame for rocking the frame about the pivot for use in setting a hook in the mouth of a fish whereby said fishing rod holder quickly releases the fishing rod as it is picked up from said front and rear cradle members after the hook has been set.

2. The fishing rod holder of claim 1 wherein the frame is offset.

3. The fishing rod holder of claim 1 wherein the pivot is attached to a mounting member.

4. A fishing rod holder comprising an offset elongated wire frame with a front cradle member being generally U-shaped facing upwardly and a rear cradle member being generally U-shaped facing downwardly, said wire frame having a transverse pivot between said front and rear cradle members with a stop between the pivot and the wire frame to prevent the wire frame from over-rotating and spilling a fishing rod that is seated in said front and rear cradle members, a resilient biasing member for biasing the frame against said stop, and a lever attached to the rear of the elongated wire frame for rocking the wire frame about the pivot for use in setting a hook in the mouth of a fish whereby said fishing rod holder quickly releases the fishing rod as it is picked up from said front and rear cradle members after the hook has been set.

5. The fishing rod holder of claim 4 wherein the pivot is attached to a rod mounting member and the resilient biasing member is a spring interconnecting the front cradle member with the rod mounting member below the pivot.

6. The fishing rod holder of claim 5 wherein the rod mounting member terminates in a spike for insertion into a bank.

7. The fishing rod holder of claim 5 wherein the rod mounting member terminates in a C-clamp.

* * * * *